(12) United States Patent
Martin et al.

(10) Patent No.: US 7,498,530 B2
(45) Date of Patent: Mar. 3, 2009

(54) SENSOR ASSEMBLY FOR TANK CARS

(75) Inventors: Michael Charles Martin, East Troy, WI (US); Roger Pittman Hawkins, Naperville, IL (US)

(73) Assignee: General Electric Company, Schenectady, NY (US)

( * ) Notice: Subject to any disclaimer, the term of this patent is extended or adjusted under 35 U.S.C. 154(b) by 488 days.

(21) Appl. No.: 11/287,817

(22) Filed: Nov. 28, 2005

(65) Prior Publication Data

US 2007/0120665 A1    May 31, 2007

(51) Int. Cl.
*H01H 35/00* (2006.01)
(52) U.S. Cl. .......................................... 200/61; 200/543
(58) Field of Classification Search .................... 200/61
See application file for complete search history.

(56) References Cited

U.S. PATENT DOCUMENTS

| | | | |
|---|---|---|---|
| 3,961,323 A | 6/1976 | Hartkorn | .................... 340/280 |
| 4,110,581 A * | 8/1978 | Meunier | ..................... 200/574 |
| 4,167,659 A * | 9/1979 | Yamanaka et al. | .......... 200/401 |
| 4,290,368 A | 9/1981 | Mazzini | ..................... 105/341 |
| 4,745,250 A | 5/1988 | Mayo | ...................... 219/10.55 |
| 5,520,026 A | 5/1996 | Ackland | .................... 68/12.26 |
| 5,665,947 A * | 9/1997 | Falcon | ..................... 200/61.18 |
| 6,207,914 B1 * | 3/2001 | Mori | .......................... 200/524 |
| 6,910,427 B2 | 6/2005 | Woodall et al. | ............. 105/358 |
| 6,935,205 B2 * | 8/2005 | Danek | ......................... 74/513 |

* cited by examiner

*Primary Examiner*—Elvin G Enad
*Assistant Examiner*—Lheiren Mae A Anglo
(74) *Attorney, Agent, or Firm*—Drinker Biddle & Reath LLP

(57) ABSTRACT

A sensor assembly, system and method for using a sensor assembly is disclosed making use of a sealed switch and an actuator that converts linear motion in a plane to linear motion in a perpendicular plane. The motion of the actuator in the perpendicular plane actuates the switch which signals that hatch is in an open position.

11 Claims, 8 Drawing Sheets

Side View of One Embodiment of the Sensor Assembly with the Actuator Rod and Actuating Member in the Position of the Hatch being in the Open State.

FIG 1. Side View of One Embodiment of the Sensor Assembly with the Actuator Rod and Actuating Member in the Position of the Hatch being in the Open State.
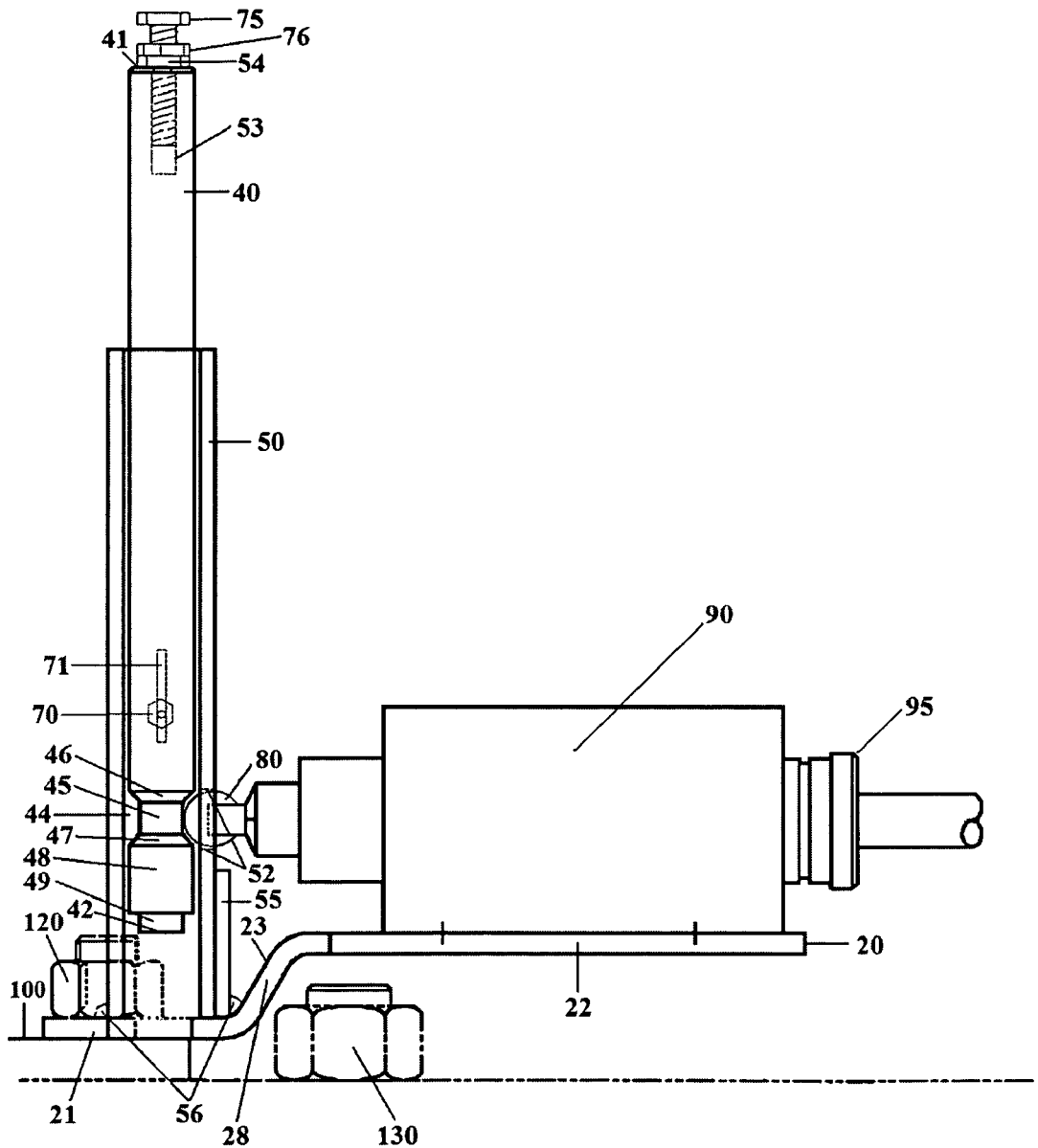

FIG 2. Front View of One Embodiment of the Sensor Assembly with the actuator rod and actuating member in the Position of the Hatch being in the Open State
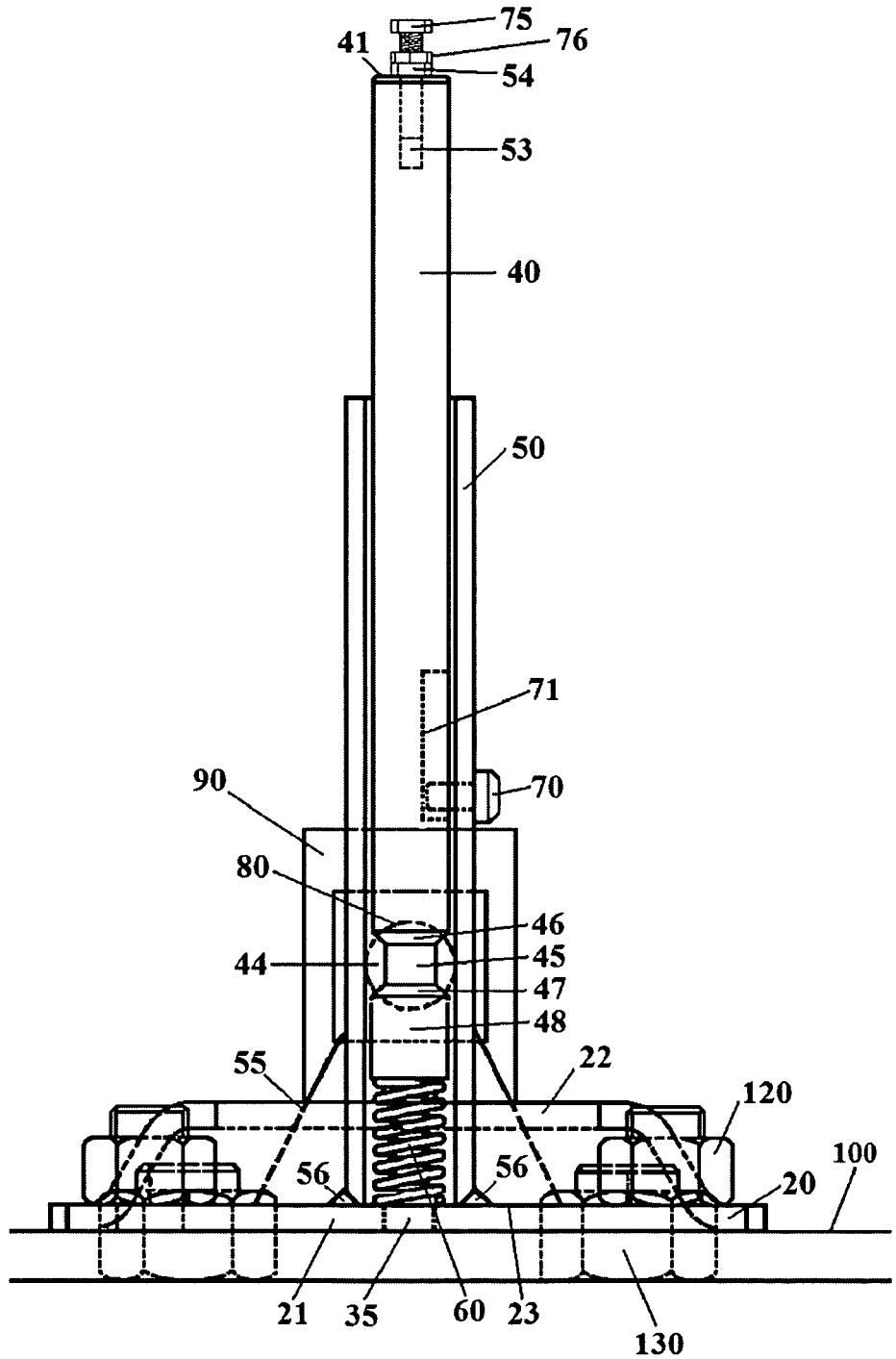

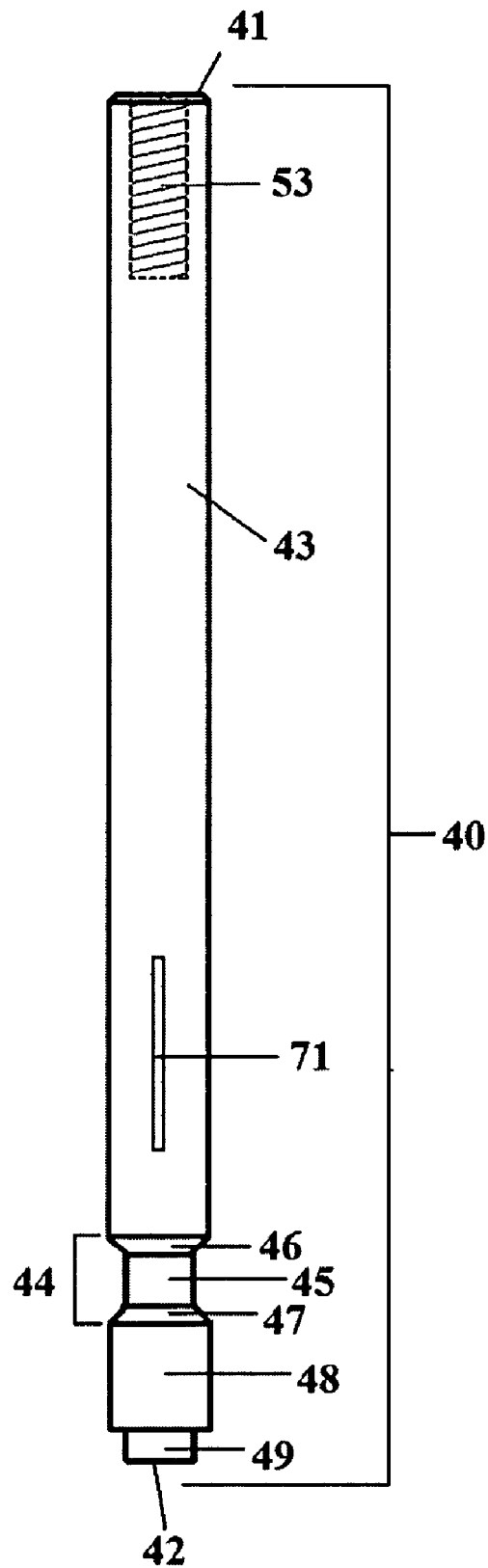
FIG 3. Side View of One Embodiment of the Actuator Rod

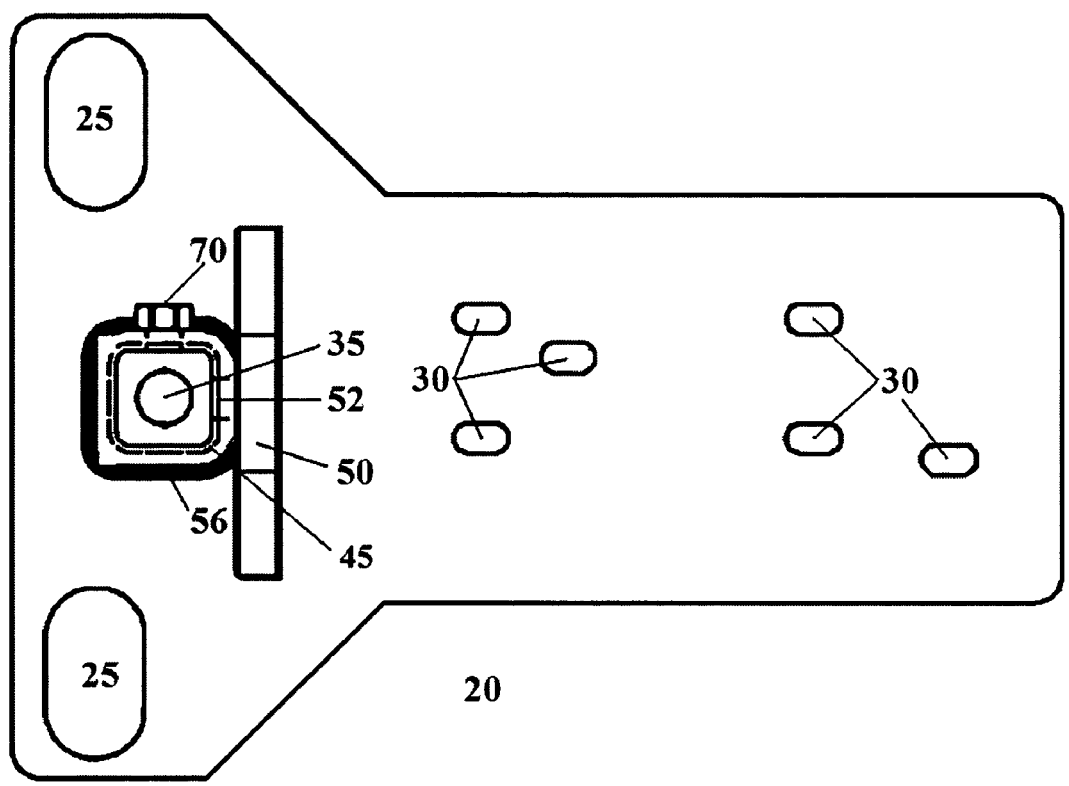
FIG 4. Top View of One Embodiment of the Baseplate

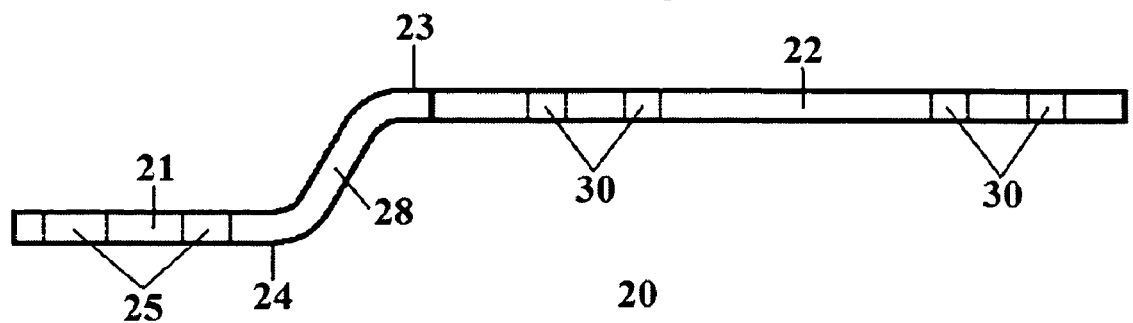
FIG 5. Side View of One Embodiment of the Baseplate

FIG 6. Side View of One Embodiment of the Sensor Assembly with the Actuator Rod and Actuating Member in the Position in the Position of the Hatch being in the Closed State
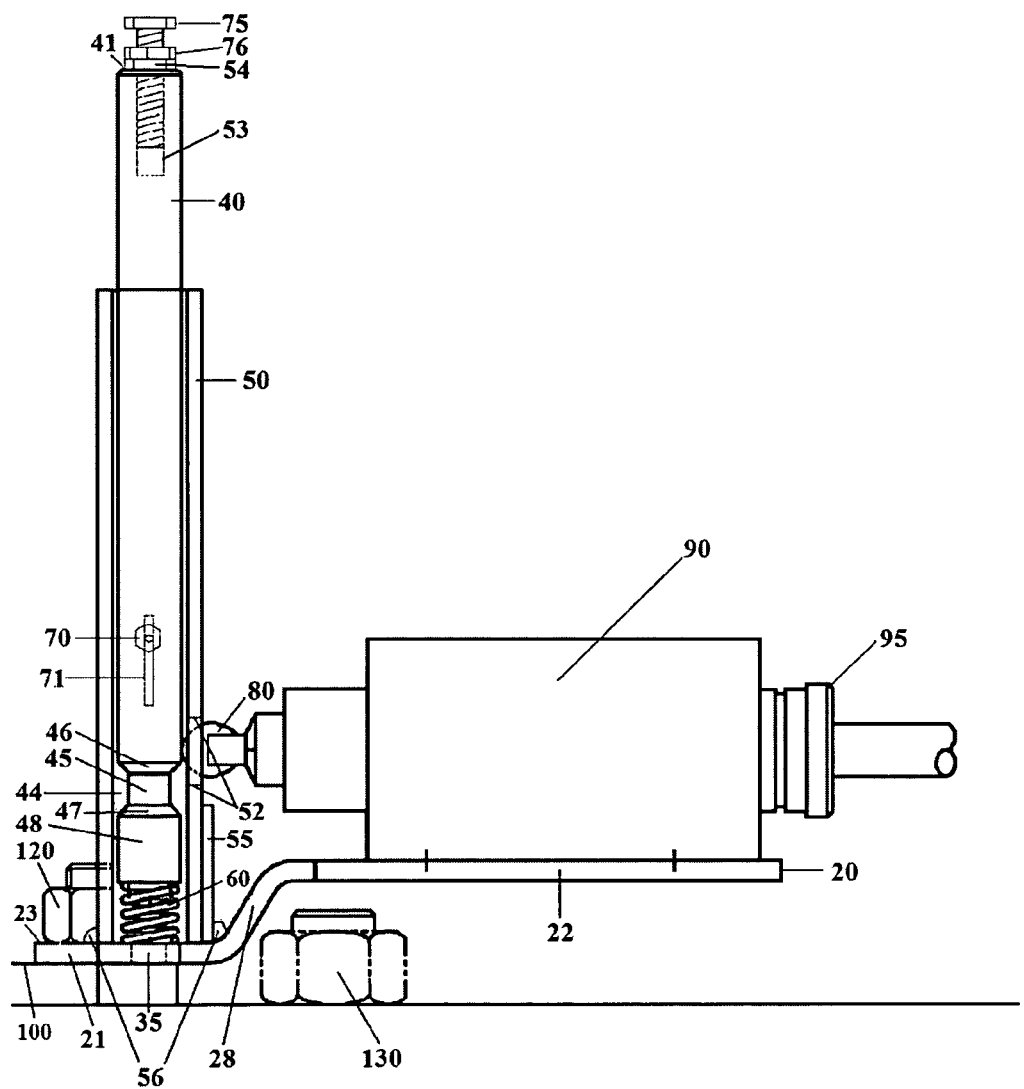

FIG 7. Block Diagram of Sensor System
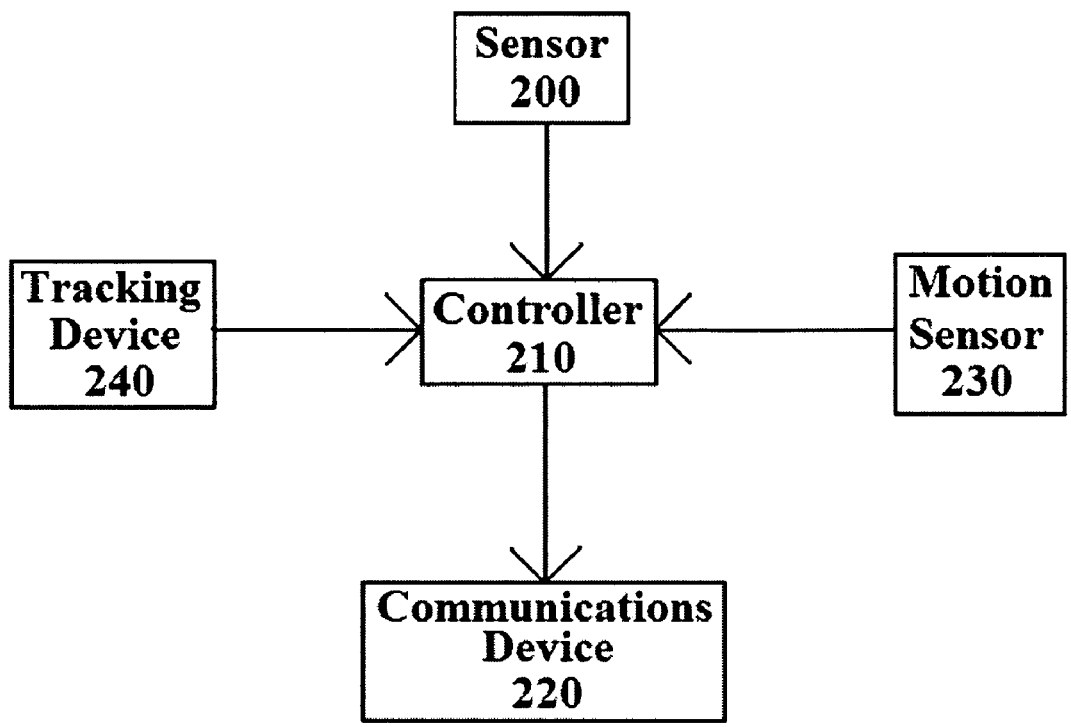

FIG 8. Block Diagram of Method of Use of Sensor System
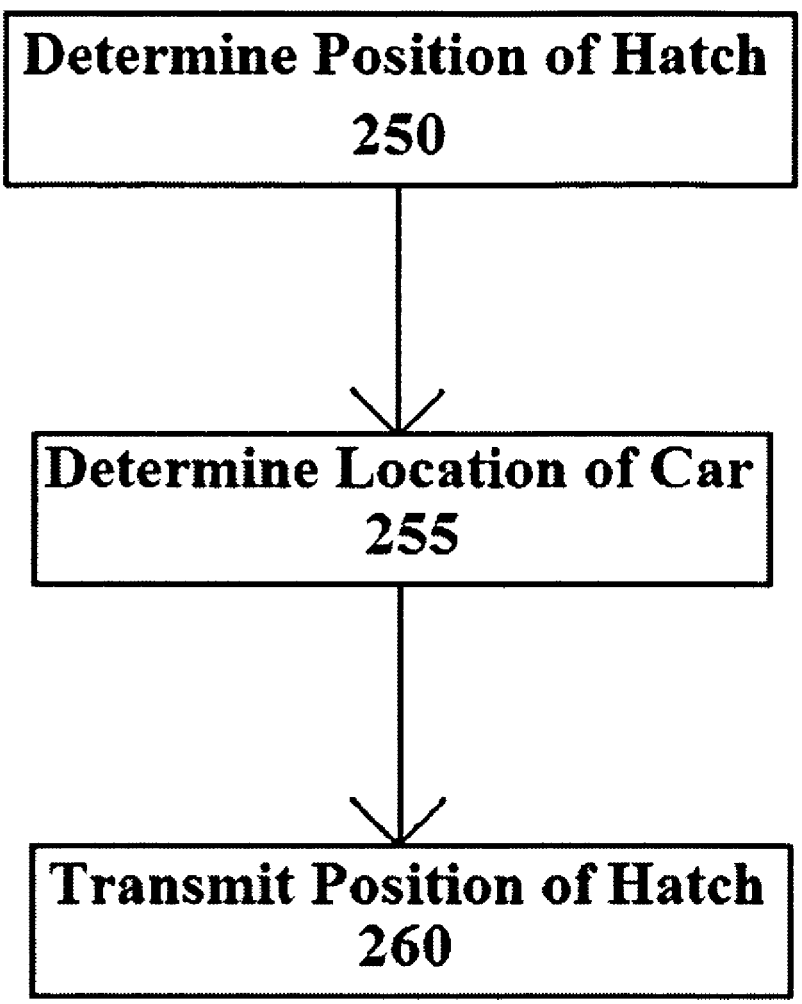

SENSOR ASSEMBLY FOR TANK CARS

FIELD OF THE INVENTION

The present invention relates to an apparatus, system, and method for detecting the closure status of the hatch on a tank car. The sensor assembly is designed to be used under a variety of conditions, including where hazardous materials may be transported or stored in a tank car, and is designed to interface into a telematics system that monitors the status and movement of tank cars.

BACKGROUND OF THE INVENTION

The use of telematics systems that integrate wireless communications, vehicle monitoring systems, and location devices is known in the art of vehicle and system monitoring. Telematics systems are often used for the collection and monitoring of vehicle conditions, where the collection of information such as engine RPM, oil pressure, braking, hours of operation and engine temperature is made on vehicles such as cars or trucks. In addition to monitoring engine conditions, telematics systems may be used in vehicles for a variety of other functions, such as sensing a crash and alerting emergency personnel, or detecting the theft of a vehicle. Telematics systems are often employed by businesses that use fleets of vehicles so that the need for maintenance and repairs and the security of personnel and cargo can be monitored.

Telematics systems are also used to monitor the security or status of many types of cargo, both when such cargo is in-transit and when such cargo is in storage. For cargo that is not hazardous in nature, a simple switch that detects the opening or closing of doors or covers may be linked to a telematics system that remotely notifies a user of the status, or change in status, of a door. The switches and systems used in these systems are usually magnetic contact switches like the type used to monitor the doors and windows in a home alarm system.

The use of telematics systems, and electronics generally, in the protective housing, or dome, of tank cars used to ship (either by rail or by roadways) or store hazardous chemicals presents special problems not addressed by the prior art. Properties which make a chemical hazardous, such as reactivity, combustibility, and flammability, necessitate the use of special equipment in the tank cars for the safe transport and storage of the materials. For example, it is necessary to ensure that devices used in the transport and storage of hazardous materials do not produce sparks as these could react with the hazardous materials and result in a fire or an explosion. In addition, the devices used must not be susceptible to vapors from corrosive chemicals that could render them inoperable.

The use of sensors in the protective housing of tank cars also presents special problems because of the lack of space within the protective housing of a tank car. Railroad tank cars and over the road tank trucks used for the transport and storage of hazardous chemicals have significant structural elements to ensure the vessels remain stable and intact under a wide variety of conditions. Railroad tank cars have contained circular areas on the top of the railcar, known as protective housings, manway covers and also domes, which house and protect the valves that provide access to the contents of the railcar. Within the protective housing there is also an access port that allows personnel to physically enter the tank. This access port is normally closed and secured to the tank with large nuts and bolts. The combination of the valves and access port nuts and bolts within the protective housing occupy most of the space within the housing, making it difficult to place additional items, such as sensors, within the housing of a railcar.

Another consideration that has made it difficult to use sensors in a protective housing with a telematics system is the rugged physical environment of the housing. Due to the potentially hazardous nature of the cargo in tank cars, personnel who repair, maintain, load, and unload the tank cars are often required to wear a variety of specialized protective gear when using the valves or otherwise working within the protective housing of the tank car. That gear is typically bulky and may obscure vision, requiring that any equipment within the protective housing be able to withstand accidental contact by the personnel, their gear, and by the tools being used by the personnel (which are large because of the size of the nuts and bolts used within the hatch). The magnetic contact door sensors of the prior art are not able to withstand the environment within a protective housing of a tank car.

BRIEF DESCRIPTION OF THE INVENTION

Accordingly, the present invention is directed to a sensor assembly for use in the protective housing of railroad tank cars, over the road tank trucks, or other type of tanks, that substantially obviates one or more of the problems due to limitations and disadvantages of the related art.

In an embodiment of the present invention, a sensor assembly is provided for use in a protective housing that utilizes a sealed switch and allows the sensor and the actuator of the sensor to be mounted in a position in the protective housing of a tank car which minimizes the potential risk of damage to the unit and personnel using the protective housing of the tank car by locating the sensor in the housing where there is minimal intrusion into the workspace.

The present invention provides a sensor assembly for determining the state of closure of a hatch where the sensor assembly is mounted to the tank car using existing fasteners that are part of the tank car.

Additional features and advantages of the invention will be set forth in the description which follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a sensor assembly is provided that uses a sealed switch which is incorporated into a monitoring system which detects the presence of an open hatch on a tank car.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 shows a side view of one embodiment of the sensor assembly with the actuator rod and actuating member in the position of the hatch being in the open state.

FIG. 2 shows a front view of one embodiment of the sensor assembly with the actuator rod and actuating member in the position of the hatch being in the open state.

FIG. 3 shows the side view of one embodiment of the actuator rod.

FIG. 4 shows the top view of one embodiment of the baseplate.

FIG. 5 shows the side view of one embodiment of the baseplate.

FIG. 6 shows a side view of one embodiment of the sensor assembly with the actuator rod and actuating member in the position of the hatch being in the closed state.

FIG. 7 shows a block diagram of the sensor system.

FIG. 8 shows a block diagram of a method of use of the Sensor System.

DETAILED DESCRIPTION OF THE INVENTION

Reference will now be made in detail to an embodiment of the present invention, example of which is illustrated in the accompanying drawings.

FIG. 1 shows a side view of one embodiment of the sensor assembly 200 with the actuator rod 40 and actuating member 80 in their positions when the hatch is in the open state. Baseplate 20 is connected to a hollow rod sleeve 50. Rod sleeve 50 and alignment plate 55 are joined to each other and the top surface 23 of baseplate 20 preferably with a weld 56. Alignment plate 55 and the rod sleeve 50 are substantially perpendicular to the top surface 23 of baseplate 20. Actuator rod 40 is located within rod sleeve 50 and is placed on a spring 60 (not shown in FIG. 1) which places the bottom surface 42 of actuator rod 40 at some distance above baseplate 20 when the tank car hatch is open. When the tank car hatch is closed, the hatch contacts the head of extension device 75 which is connected to actuator rod 40, depressing actuator rod 40 towards baseplate 20, which decreases the distance of the bottom surface 42 of actuator rod 40 above baseplate 20.

Actuator rod 40 contains an engagement notch 44 which is interfaced through actuating member 80 with switch 90. Hole 52 is positioned in the lower section of hollow rod sleeve 50 to allow actuating member 80 unrestricted movement through rod sleeve 50. Engagement notch 44 in the actuator rod 40 engages actuating member 80 when the tank car hatch is open, causing movement of actuating member 80 away from the switch 90, resulting in a signal being sent from switch 90 through an interface 95 to a device which indicates the position of the tank car hatch. In an embodiment, switch 90 is a commercially available sealed switch of the type used when hazardous materials are present. In one embodiment, the engagement notch 44 has an upper section 46, a center section 45, and a lower section 47, where the center section 45 is a full-circumference cylinder with a smaller diameter than the actuator rod, and upper section 46 and lower section 47 are beveled areas that provide a transition between the upper full-width section 43 of the actuator rod 40 and the lower full-width section 48 of the actuator rod 40. The beveled areas permit the actuating member to easily slide from the cylindrical section of the engagement notch to the actuator rod.

Fastener 70 engages retaining slot 71 located along the longitudinal axis of the actuator rod 40. Fastener 70 prevents actuator rod 40 from being unintentionally removed from the assembly. Hole 53 is drilled into the longitudinal axis of actuator rod 40 from the top surface 41 of the actuator rod 40. Fastener 54, such as a nut, is attached to the top surface 41 of the actuator rod 40, preferably with a weld. Fastener 54 attaches extension device 75, such as a carriage bolt, to actuator rod 40, allowing the height that extension device 75, extends above the top surface 41 of the actuator rod 40 to be adjusted. The presence of an adjustable nut 76 on the extension device 75, allows the extension device 75 to be locked into a desired position based on the configuration of the tank car hatch.

Baseplate 20 is mounted to a surface 100 on the tank car through the first planar region 21 in baseplate 20 using existing fasteners 120 in the protective housing of the tank car. The presence of additional fasteners 130 in the protective housing of the tank car may prohibit the use of a baseplate that is completely flat. A second planar region 22 of the baseplate 20 is located on a plane that is parallel to the first planar region 21 of the baseplate 20. The region of the baseplate 20 between the first planar region 21 and second planar region 22 is composed of a transition region 28 comprising two bends in baseplate 20. A switch 90 is mounted on the second planar region 22 of the baseplate. Switch 90 is attached to a notification device which indicates the state of closure of the tank car hatch, such as a telemetric unit, through interface 95.

FIG. 2 shows a front view of one embodiment of the sensor assembly 200 with actuator rod 40 and actuating member 80 in their positions when the hatch is in the open state. Baseplate 20 is connected to a hollow rod sleeve 50 within which an actuator rod 40 is mounted. Alignment plate 55 and rod sleeve 50 are joined to each other and the top surface 23 of the first planar region 21 of baseplate 20, preferably with a weld 56. Alignment plate 55 and the rod sleeve 50 are substantially perpendicular to the top surface 23 of baseplate 20. Actuator rod 40 is located within rod sleeve 50 and is placed on a spring 60 which rest on the first planar region 21 of baseplate 20. In one embodiment, the engagement notch 44 has an upper section 46, a center section 45, and a lower section 47, where the center section 45 is a full-circumference cylinder with a smaller diameter than the actuator rod, and upper section 46 and lower section 47 are beveled areas that provide a transition between the upper full-width section 43 of the actuator rod 40 and the lower full-width section 48 of the actuator rod 40. The beveled areas permit the actuating member to easily slide from the cylindrical section of the engagement notch to the actuator rod. Drain hole 35 in the baseplate 20 at the center of hollow rod sleeve 50, allows the bottom section of the vertical actuator rod 40 to pass through the baseplate 20. The bottom surface 42 (not shown as it is contained within the spring 60) of actuator rod 40 is located at some distance above baseplate 20 when the tank car hatch is open. When the tank car hatch is closed, the hatch contacts the head of extension device 75 which is connected to actuator rod 40, depressing actuator rod 40 towards the baseplate 20, which decreases the distance of the bottom surface 42 (not shown as it is contained within the spring 60) of the actuator rod 40 above the baseplate 20.

Actuator rod 40 contains an engagement notch 44 which is interfaced through actuating member 80 with switch 90. When the tank car hatch is open, engagement notch 44 in the actuator rod 40 and the actuating member 80 move into their engaged positions, as shown in FIG. 2. Fastener 70 engages retaining slot 71 located along the longitudinal axis of actuator rod 40. Fastener 70 prevents actuator rod 40 from being unintentionally removed from the assembly. Hole 53 is drilled into the longitudinal axis of vertical actuator rod 40 from the top surface 41 of the actuator rod 40. Fastener 54, such as a nut, is attached to the top surface 41 of the actuator rod, preferably with a weld. Fastener 54 attaches extension device 75, such as a carriage bolt, to actuator rod 40, allowing the height the extension device 75, extends above the top surface 41 of the actuator rod 40 to be adjusted. Adjustable nut 76 on extension device 75 can be brought in contact with fastener 54 to allow extension device 75 to be locked into a desired position based on the configuration of the tank car hatch.

Baseplate 20 is mounted to a surface 100 on the tank car through the first planar region 21 in the baseplate 20 using existing fasteners 120 in the protective housing of the tank car. The presence of additional fasteners 130 may prohibit the use of a baseplate that is completely flat. A second planar region 22 of the baseplate 20 is located on a plane that is parallel to the first planar region 21 of the baseplate 20. Switch 90 is mounted on the second planar region 22 of the baseplate. Switch 90 is attached through an interface 95 to a device which indicates the state of closure of the tank car hatch.

FIG. 3 shows a side view of an embodiment of actuator rod 40, where the rod is substantially cylindrical in shape. As used herein, substantially cylindrical means having a circular or substantially circular profile along the longitudinal axis. The dimensions of the circular or substantially circular profile can be uniform throughout the entirety of the rod, or can vary along the longitudinal axis of the rod. For example, the rod can include a necked-down area. Actuator rod 40 has a flat top surface 41, a bottom surface 42, engagement notch 44, lower full-width section 48 and bottom region 49 along its longitudinal axis. The upper section 43 of the actuator rod 40 is cylindrical, with the connection between the top surface 41 and the upper cylindrical section being a beveled edge. A hole 53 is drilled on the longitudinal axis to a depth necessary to allow a extension device 75 to be completely retracted into actuator rod 40.

Engagement notch 44 is located below the upper full-width section 43 of the actuator rod 40. In an embodiment, engagement notch is comprised of an upper beveled section 46, narrow cylindrical section 45 and lower beveled section 47. Upper beveled section 46 connects narrow cylindrical section 45 to upper section 43 of the vertical actuator rod. Lower beveled section 47 connects narrow cylindrical section 45 to the lower full-width section 48 of the vertical actuator rod 40. Lower full-width section 48 of the actuator rod 40 is of a larger diameter than 45, but of sufficient diameter that actuating member 80 (not shown) is locked in place by engagement notch 44. Preferably the diameter of lower section 43 is the same as the diameter of upper section 43. In an alternate embodiment, the shape of bottom region 49 may be a half-sphere, half-oval or other rounded shape which facilitates entrapment of horizontal actuating member 80 by engagement notch 44. Retaining slot 71 located along the longitudinal axis of upper section 43 of actuator rod 40 is engaged by fastener 70 to prevent actuator rod 40 from being unintentionally removed from the assembly.

FIG. 4 depicts the top view of an embodiment of the baseplate 20 where holes 25 pass through baseplate 20 to allow existing fasteners 120 (not shown), mounted on the tank car, to be placed to connect the bottom surface of baseplate 20 with surface 100 (not shown) on the tank car. Holes 25 are preferably slots which allow for adjustments to be made when mounting the baseplate 20 to the tank car. When holes 25 are slots, either open or closed slots may be used. Slotted holes 25 in baseplate 20 can be located to accommodate the spacing of existing fasteners 120 from different tank car manufacturers. In one embodiment, baseplate 20 contains a plurality of holes 30 through which fasteners are placed to mount switch 90 to baseplate 20. The tops of alignment plate 55 and the hollow rod sleeve 50 are shown, along with welds 56 for connecting the alignment plate 55 and the hollow rod sleeve 50 to the baseplate 20. Hole 35 in the baseplate 20 at the center of hollow rod sleeve 50, allows the bottom section of the vertical actuator rod 40 to pass through the baseplate 20.

FIG. 5 shows the side view of an embodiment of baseplate 20 where the first planar region 21 contacts the tank car. Holes 25 pass through the baseplate through which existing fasteners 120 mounted on the tank car are placed to connect the bottom surface 24 of the baseplate 20 with a surface 100 on the tank car. Preferably, holes 25 are slots which allow adjustments to be made when mounting baseplate 20 to the tank car. When holes 25 are slots, either open or closed slots may be used. In an embodiment, baseplate 20 contains a second planar region 22 located on a plane that is parallel to the first planar region 21 of the baseplate 20. The region of the baseplate 20 between the first planar region 21 and the second planar region 22 is composed of a transition region 28. When the first planar region 21 is on a plane different than that of the second planar region 22, the transition region 28 comprises bends in the baseplate 20. In an embodiment, second planar region 22 contains a plurality of holes 30 through which fasteners are placed to mount switch 90 to baseplate 20.

FIG. 6 shows a side view of one embodiment of the sensor assembly 200 with actuator rod 40 and actuating member 80 in their positions when the hatch is in the closed state. Baseplate 20 is connected to hollow rod sleeve 50. Rod sleeve 50 and alignment plate 55 are joined to each other and the top surface 23 of baseplate 20 preferably with a weld 56. Alignment plate 55 and rod sleeve 50 are substantially perpendicular to the top surface 23 of baseplate 20. Actuator rod 40 is located within rod sleeve 50 and is placed on a spring 60, which holds the bottom surface 42 of actuator rod 40 (not shown due to presence of spring 60) at a distance closer to baseplate 20 than when the tank car hatch is open. Hole 52 is positioned in the lower section of hollow rod sleeve 50 to allow actuating member 80 unrestricted movement through rod sleeve 50. When the hatch is in the closed position, actuator rod 40 is located closer to baseplate 20, spring 60 is compressed and engagement notch 44 has moved towards baseplate 20 and is in a position were it cannot interfaced with actuating member 80. The lower portion of the upper full-width section 43 of actuator rod 40 contacts actuating member 80 which is moved towards switch 90, resulting in a change in position in switch 90, which generates a signal.

Fastener 70 engages retaining slot 71, located along the longitudinal axis of actuator rod 40. Fastener 70 prevents actuator rod 40 from being unintentionally removed from the assembly. Hole 53 is drilled into the longitudinal axis of actuator rod 40 from the top surface 41 of the actuator rod 40. Fastener 54, such as a nut, is attached to the top surface 41 of the actuator rod 40, preferably with a weld. Fastener 54 attaches extension device 75, such as a carriage bolt, to actuator rod 40, allowing the height the extension device 75, extends above the top surface 41 of the actuator rod 40 to be adjusted. The presence of adjustable nut 76 on extension device 75 allows extension device 75 to be locked into a desired position based on the configuration of the tank car hatch.

Baseplate 20 is mounted to the tank car through the first planar region 21 in baseplate 20 using existing fasteners 120 in the protective housing of the tank car. The presence of additional fasteners 130 in the protective housing of the tank car may prohibit the use of a completely flat baseplate. A second planar region 22 of baseplate 20 is located on a plane that is parallel to the first planar region 21 of baseplate 20. The region of the baseplate 20 between first planar region 21 and second planar region 22 is composed of transition region 28 which is comprised of two bends in the baseplate 20. Switch 90 is mounted on the second planar region 22 of baseplate 20.

Switch 90 is attached through interface 95 to a device which indicates the state of closure of the tank car hatch.

Importantly, the embodiment of the sensor assembly 200 for the protective housing shown in FIGS. 1 through 6 is only one particular embodiment of the invention. In an alternative embodiment, sensor assembly 200 could be mounted horizontally. In this embodiment the "top" of the actuator rod 40 could be actuated by a lever or cam assembly that is actuated by the hatch lid or the hatch hinge, or other mechanical assembly. Accordingly, the actuator rod 40 need not be directly contacted by the hatch, as long as a lever, cam assembly, or other mechanical assembly or linkage causes the actuator rod to move when the hatch moves. In addition, in another embodiment of the protective housing sensor, the actuating rod 40 can be positioned so that the actuating member contacts the actuating rod in the engagement notch when the hatch lid is in the open state, rather than when the hatch lid is in the closed state.

Furthermore, in alternative embodiments of the protective housing sensor, different types and numbers of baseplates can be used, or the system can be installed without a baseplate. For example, in one embodiment two separate baseplates could be used to attach the actuator rod 40 and 2-position electrical switch 90 within the protective housing, as long as the substantially perpendicular relationship between the actuator rod 40 and 2-position electrical switch 90 is maintained to allow actuation of the electrical switch 90. In another embodiment, the actuator rod 40 could be welded directly to a physical point within the protective housing, and the 2-position electrical switch 90 could be mounted with a baseplate as needed to maintain the relationship between the actuator rod 40 and switch 90.

FIG. 7 is a block diagram of an exemplary system using the sensor assembly to monitor the status of the hatch lid. In one embodiment, the system includes a sensor assembly 200, a controller 210, and a communications device 220. The communications device 220 is used to transmit the status of the hatch lid to a remote location. For railroad tank cars, the status may be transmitted by electrical wiring between the tank car and other car(s) or locomotives(s) on the train, by a wireless communications device to other car(s) on the train, or by a wireless communications device to a central location. For over the road tank cars, the signal may be transmitted by electrical wiring between the tank car and the cab of the tractor, by a wireless communications device to the cab, or by a wireless communications device to a central location.

The controller 210 controls the timing of the communications and routes signals from various sensors (e.g., sensor assembly 200, motion sensor 230, tracking device 240) to the communications device 220. In one embodiment, the controller 210 includes a clock which will enable it to cause the transmission of information at specified times. The controller 210 will also have sufficient memory and throughput capability to process data acquired from the sensors to which it is connected. The controller 210 and communications device 220 (as well other electrically-powered devices within the system such as a tracking device) are powered by a battery (not shown) or hard-wired to the electrical system of the train or tractor to which the tank car is attached. In one embodiment each device can have a separate battery, or a single battery can be used to power all of the electrically-powered devices on the tank car. In another embodiment, the battery may be charged by a solar cell.

Communications device 220 may be a transmitter or transceiver. In one embodiment, the communications device may be a wireless transceiver. In another embodiment, the communications device 220 may be cellular wireless modem and antenna. In yet another embodiment, the communications device 220 can be a satellite transmitter. In one embodiment, the communications device 220 can be a simplex device that only permits communication in one direction, from the tank car to a remote location. In another embodiment, the communications device 220 can be a duplex device that permits two-way communications between a tank car and a remote location.

Transmission of the status of the hatch lid may be set to occur upon different conditions. In one embodiment, transmission of the status of the hatch lid is performed only when there is a change in the position of the sensor switch, which corresponds to the opening or closing of the hatch. In another embodiment, the status of the hatch lid is periodically (e.g., once per day, once per week) transmitted. In yet another embodiment, the transmission of the status of the hatch is performed when a motion sensor 230 indicates that the tank car is in motion and the hatch is in the open position, or when a motion sensor 230 indicates that the tank car has started or stopped motion.

In other embodiments, the system may include a tracking device 240, a motion sensor 230, or one or more of other types of sensors. The tracking device is a position determining system such as the Global Positioning System (GPS), Differential GPS (DGPS), Eurofix DGPS, and the Global Navigation Satellite System (GLONASS). Importantly, the present invention is well-suited to use any position determining system (both terrestrial and satellite based) as well as future systems that may be developed, and is not dependent on the use of a particular system. The tracking device 240 will also include a receiver for receiving positioning information. In one embodiment, the receiver for the tracking device 240 is part of, or integrated with, the transceiver or receiver of the communications device, although the receiver can also be a separate device specifically for the tracking system, or can be a receiver integrated with the tracking device.

A motion sensor 230 in the system would be capable of detecting whether the tank car is stationary or in motion. The motion sensor 230 can be any of a number of type of motion sensors, including but not limited to an accelerometer, a vibration sensor, an acoustical sensor, a triaxial accelerometer, or a combination thereof. In one embodiment the motion sensor 230 can be a standalone unit that is electrically connected to the controller, and in another embodiment the motion sensor 230 can also be integrated into the tracking device 240, which is then electrically connected to the controller 210.

Other types of sensors can be used with the system of the present invention. For example, a temperature sensor could be added, with the output of the sensor being connected to the controller, which can then transmit the status of the temperature sensor through the communications device 220. Other sensors that can be used include, but are not limited to, valve condition sensors, impact sensors, hatch sensors, and bearing temperature sensors. Any combination of the above sensors, or other types of sensors, can be added to the system and connected to the controller 210, provided that the controller 210 is sized appropriately to have an adequate number of sensor inputs and has sufficient memory and throughput capability to process data acquired from the sensors to which it is connected.

FIG. 8 is a block diagram of an exemplary method of using a sensor to monitor the status of the hatch lid. In the first step of the method, the position of the hatch is determined 250 using a sensor in a protective housing on a tank car. The sensor can be any sensor that monitors the position of the hatch, and in one embodiment is the sensor assembly of the present application.

In the second step of the method, the location of the tank car is determined 255 using a tracking device 240. The tracking device 240 is a position determining system such as the Global Positioning System (GPS) or other similar system. The tracking device 240 includes a receiver (which can be part of the communications device 220, part of the tracking device, or a separate device) for receiving positional information.

In the last step of the method, the position of the hatch and/or the location of the tank are transmitted 260 to a remote location. For this step, a communications device 220 may be used to transmit the information. The communications device 220 may transmit the information wirelessly to a remote location, or the communications device 220 may transmit the information by hardwire to another part of the train, such as a locomotive, or truck that is hauling the tank car. In an alternative embodiment, a communications device 220 may not be necessary to transmit the information by hardwire, if the distance being traveled by the information is short and appropriate wiring is used.

Many different types of sensors can be used with the method, and the information obtained from the sensors transmitted. Some of the sensors that may be added include, but are not limited to, temperature sensors, pressure sensors, load sensors, valve condition sensors, impact sensors, hatch sensors, and bearing temperature sensors. Any combination of the above sensors, or other types of sensors, can be added to the system.

Different schemes can be used to determine when information from the sensors should be transmitted from the tank car to the remote location. In one embodiment, information is transmitted periodically, such as daily or weekly. In another embodiment, the transmission of information is tied to the change in status of one of the sensors on the tank car. For example, a scheme could be used under which a motion sensor 230 is used with the method, and transmission of information is performed whenever the motion sensor 230 senses the start of motion or the end of motion. In another embodiment, a scheme could be used under which transmission is performed each time the position of the hatch changes, i.e., each time the hatch is open or closed. In one other embodiment, a scheme using multiple sensors can be used. For example, a scheme can be used under which transmissions are made whenever a motion sensor detects that the tank car is in motion and a sensor detects that the hatch is open. Any other scheme can be used depending on the sensors used and the user's purposes in monitoring the tank car.

The schemes used for transmission may be implemented by a controller 210. In one embodiment, the controller 210 includes a clock which will enable it to cause the transmission of information at specified times. The controller will also have sufficient memory and throughput capability to process data acquired from the sensors to which it is connected. Each sensor is connected to the controller 210, and the controller 210 is connected to the communications device 220.

It will be apparent to those skilled in the art that various modifications and variation can be made in the switch assembly of the present invention without departing from the spirit or scope of the invention. Thus, it is intended that the present invention cover the modifications and variations of this invention provided they come within the scope of the appended claims and their equivalents.

What is claimed is:

1. A sensor assembly for use in a hatch position notification system on a tank car, the sensor assembly comprising:

a hollow rod sleeve having a top end, a bottom end, and a side, wherein the side of the hollow rod sleeve has a hole through which an actuating member can pass;

an actuator rod within the hollow rod sleeve, the actuator rod having a top end, a bottom end, and an engagement notch, wherein the engagement notch is located proximate to the hole in the hollow rod sleeve;

a spring within the hollow rod sleeve, the spring having a top end and a bottom end, wherein the bottom end of the spring is adjacent to a fixed surface, and the top end of the spring is adjacent to the bottom end of the actuator rod;

a 2-position electrical switch, the switch having an actuating member substantially perpendicular to the actuator rod, wherein the actuating member extends from the electrical switch through the hole in the hollow rod sleeve and wherein the actuating member has a curved end that contacts the actuator rod, wherein, when a hatch is in the open position, the spring is extended and the actuator rod is positioned such that the curved end of the actuating member of the 2-position electrical switch makes contact with the actuator rod at a point other than the engagement notch, which places the 2-position electrical switch in a first position indicating that the hatch is opened; and wherein, when the hatch is in a closed position, the hatch causes the actuator rod to move and compress the spring, which causes the actuator rod to be positioned such that the curved end of the actuating member of the 2-position electrical switch makes contact with actuator rod at the engagement notch, which places the 2-position electrical switch in a second position indicating that the hatch is closed.

2. The sensor assembly of claim 1 further comprising a baseplate, wherein the baseplate has a first planar region for mounting the baseplate to the tank car and a second planar region for mounting the electrical switch to the baseplate, wherein the bottom of the hollow rod sleeve is connected substantially perpendicular to the first planar region of the baseplate, and wherein the bottom of the spring is adjacent to the first planar region of the baseplate.

3. The sensor assembly of claim 2 further comprising a retaining mechanism for preventing the actuator rod from exiting the hollow rod sleeve, the retaining mechanism comprising a fastener which passes through a hole in the side of the hollow rod sleeve, and which is in movable contact with a longitudinal retaining notch on the actuator rod.

4. The sensor assembly of claim 3 further comprising an alignment plate having a bottom and a side for aligning the hollow rod sleeve substantially perpendicularly relative to the baseplate, wherein the bottom of the alignment plate is connected to the first planar region of the baseplate and the side of the alignment plate is connected to the hollow rod sleeve.

5. The sensor assembly of claim 2 wherein the first planar region of the baseplate has at least one hole for mounting the baseplate to an adjacent surface on the tank car.

6. The sensor assembly of claim 2 wherein the first planar region of the baseplate has at least one slot for mounting the baseplate to an adjacent surface on the tank car.

7. The sensor assembly of claim 2 wherein the second planar region of the baseplate has at least one hole for mounting the electrical switch to the baseplate.

8. The sensor assembly of claim 1 wherein the actuator rod is substantially cylindrical.

9. The sensor assembly of claim 1 wherein the engagement notch on the actuator rod consists of full a circumference notch in the actuator rod, wherein the notch has a beveled upper section, a cylindrical center section, and a beveled lower section.

10. The sensor assembly of claim 1 further comprising an extender movably connected to the top end of the actuator rod, wherein the extender has a curved head for contacting the hatch and wherein the length of the extender can be adjusted relative to the top end of the actuator rod.

11. The sensor assembly of claim 1 wherein the curved end of the actuating member of the 2-position electrical switch comprises a rotatable wheel.

* * * * *